(No Model.)

J. TATE.
Electrical Device for Closing Stop Valves.

No. 231,865. Patented Aug. 31, 1880.

Witnesses
James Tobin
Harry Smith

Inventor
James Tate
by his Attorneys
Howson & Son

United States Patent Office.

JAMES TATE, OF BRADFORD, ENGLAND.

ELECTRICAL DEVICE FOR CLOSING STOP-VALVES.

SPECIFICATION forming part of Letters Patent No. 231,865, dated August 31, 1880.

Application filed March 24, 1880. (No model.) Patented in England January 28, 1880.

*To all whom it may concern:*

Be it known that I, JAMES TATE, a subject of the Queen of Great Britain and Ireland, and residing at Bradford, in the county of York, England, have invented certain Improvements in Apparatus for Closing the Stop-Valves in Steam or other Engines, for which I have obtained a patent in Great Britain, No. 375, dated January 28, 1880, and of which the following is a specification.

The object of my invention is to construct an apparatus operated by electricity for automatically closing the stop-valve of a steam-engine; and this object I attain by combining with the stop-valve of the engine a pressure cylinder and piston provided with a rack and pinion and devices operated by electricity for opening the valve of the cylinder and throwing the pinion into gear with toothed wheels for closing the stop-valve, as more fully described hereinafter.

Figure 1:
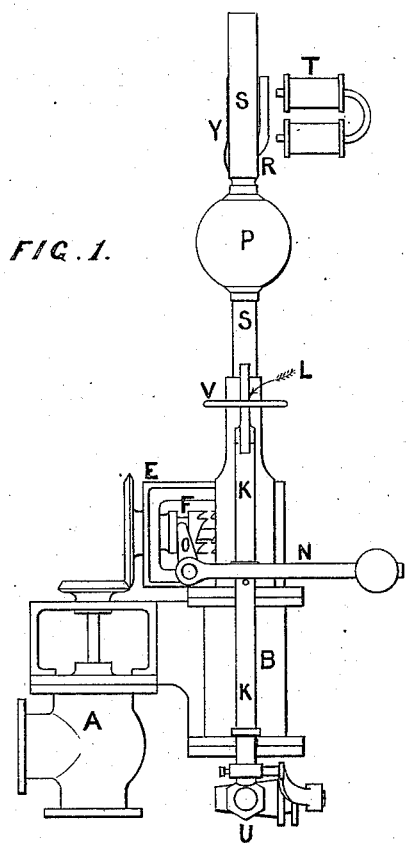
Figure 2:
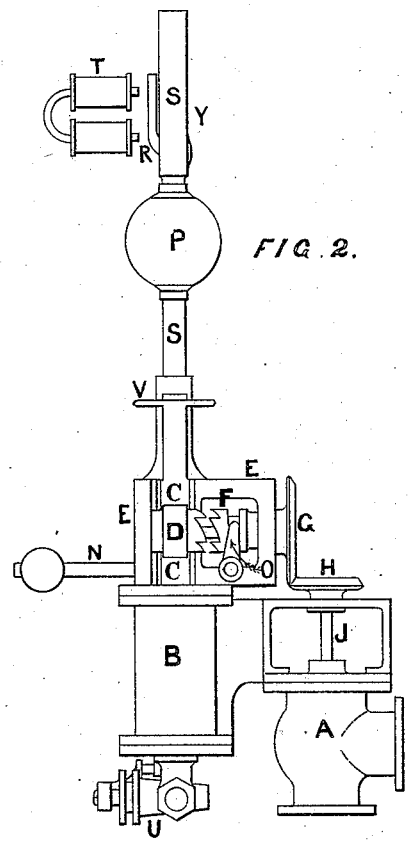
Figure 3:
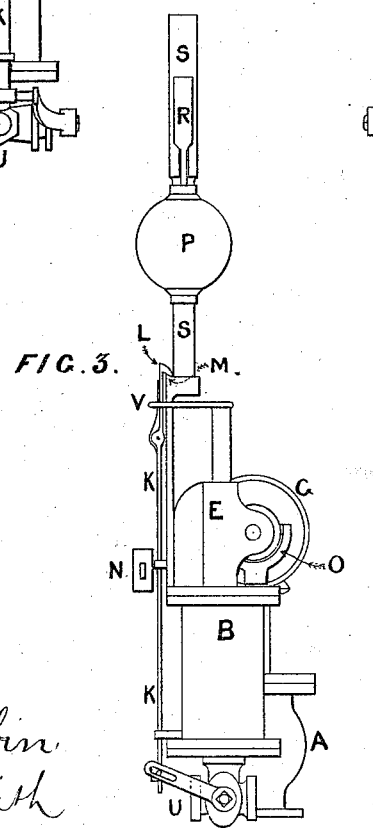
Figure 4:
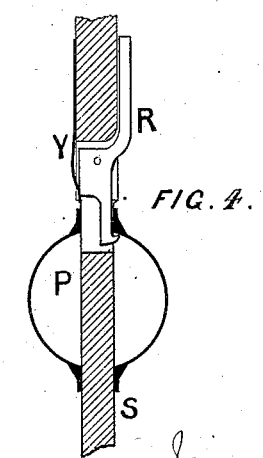

In the accompanying drawings, Figure 1 is a front elevation of the apparatus; Fig. 2, a rear view; Fig. 3, a side view, and Fig. 4 a detached sectional view drawn to an enlarged scale.

Adjacent to the stop or throttle valve A is a vertical cylinder, B, provided with a piston whose rod C is made in the form of a rack and gears into a pinion, D, adapted to turn freely on a shaft having its bearings in the frame E. The upper end of the cylinder is open to atmospheric pressure, while its lower end is closed and provided with a three-way cock or valve, U, of which one passage communicates with the interior of the cylinder, another with a steam or other pressure supply, while the third communicates with the atmosphere.

The arm of the plug of this cock is connected to the lower end of a vertical sliding rod, K, provided at its upper end with a spring-catch, L, which is adapted to hook onto a projection, M, on a rod, S, mounted on the frame E. A hollow ball, P, is adapted to slide on this rod S, and when in its raised position is retained by a catch on the lever R, which is pivoted in a slotted portion of the rod S, and is acted on by a spring, Y, tending to keep its hooked end outward. The upper arm of the lever R projects above the slotted portion of the rod opposite an electro-magnet, T, for which it forms an armature, and which has wires extending to any desired point—say, for instance, the main office of the works—so that the device may be operated and the engine stopped, as hereinafter described, by closing the electric circuit at that point.

On the end of the shaft on which the pinion D turns is mounted a bevel-wheel, G, gearing into a bevel-wheel, H, on the spindle J of the stop-valve. On the same shaft is a ratchet clutch-block, F, connected by a feather so as to turn with while it can slide on the said shaft. The ratchet-face of the clutch-block is adapted to fit a corresponding ratchet-face on the pinion D when the block is moved into contact with the pinion. The movement of the block is controlled by a forked arm, O, on a rock-shaft carrying the weighted arm N, which is supported by a pin on the sliding rod K, as indicated in Fig. 1.

The operation of the device is as follows: Suppose the parts to be in the positions shown in the drawings, the stop-valve A being open, the piston of the cylinder B at the bottom of its stroke, the interior of the cylinder open to the atmosphere through the valve U, while the clutch is out of gear and the ball P in its elevated position. When it is desired to stop the engine the electric circuit is closed at the desired point, so as to cause the magnet T to attract the upper end of the lever R and release the ball P, which then falls onto the catch L and throws it off its projection M. The vertical lever K thus released descends under the weight of the arm N and turns the cock U, so as to admit steam, compressed air, or other fluid pressure to the interior of the cylinder, and so cause the piston to rise and fall, and by means of its rack C turn the pinion D. The clutch-block N having been meanwhile thrown into gear with the pinion D, the shaft and gearing G H will be turned, so as to cause the screwing down or closing of the stop-valve A, and so cut off the steam-supply to the engine. On the upper end of the rack C is a ring, V, which, as the rack rises, will elevate the ball P again to its normal position, where it is retained by the lever R. When the rod K is elevated again the clutch will be thrown out and the exhaust-passage of the cock U opened, so as to allow the pressure of steam or other fluid to escape and the piston to descend. The stop-valve can at any time be opened by hand to supply steam to the engine when desired.

The wires of the electric circuit of the magnet T may be so connected with the governor as to cause the apparatus to close the valve A when the engine is running too fast. This is accomplished by connecting a lever with some moving part of the governor, and so arranging the connections of the circuit-wires in respect to the lever that when the governor rises the lever will press the wires or otherwise make the electrical connection, and so cause the closing of the valve A, as above described.

I claim as my invention—

The combination of the stop-valve of an engine with a pressure-cylinder, B, having a cock, U, and a piston and connections for operating the valve, with an electro-magnet and electric circuit and devices, substantially as described, whereby the action of the magnet causes the opening of the admission-cock of the cylinder, as set forth.

In testimony whereof I have signed my name to this specification in the presence of two subscribing witnesses.

JAMES TATE.

Witnesses:
  JOHN GILL,
  NED ROLLINSON.